US 6,680,914 B1

(12) United States Patent
Jung et al.

(10) Patent No.: US 6,680,914 B1
(45) Date of Patent: Jan. 20, 2004

(54) METHOD FOR OPTIMIZING THE PERFORMANCE OF THE CODE DIVISION MULTIPLE ACCESS SYSTEM AND THE AIR FIELD ENVIRONMENTS

(75) Inventors: Jin-saeng Jung, Sungnam (KR); Won-il Cho, Sungnam (KR); Jae-ho Jeong, Inchon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/324,420

(22) Filed: Jun. 1, 1999

(30) Foreign Application Priority Data

May 30, 1998 (KR) ........................................ 1998-20139

(51) Int. Cl.$^7$ ............................ H04L 12/26; H04J 1/16; G06F 11/00; H04B 7/00; H04Q 1/20
(52) U.S. Cl. ...................... 370/252; 370/232; 370/254; 455/456; 455/522; 375/224
(58) Field of Search ................................ 370/241, 252, 370/311, 328, 329, 335, 249, 342, 232, 234; 701/214, 215, 225; 455/456, 522, 448, 445; 375/224, 345, 377

(56) References Cited

U.S. PATENT DOCUMENTS

| | | | | |
|---|---|---|---|---|
| 5,451,839 A | * | 9/1995 | Rappaport et al. | 375/224 |
| 5,542,120 A | * | 7/1996 | Smith et al. | 455/425 |
| 5,627,834 A | * | 5/1997 | Han et al. | 370/241 |
| 5,712,899 A | * | 1/1998 | Pace, II | 455/456 |
| 5,859,838 A | * | 1/1999 | Soliman | 370/249 |
| 5,899,957 A | * | 5/1999 | Loomis | 701/214 |
| 5,940,749 A | * | 8/1999 | Cho et al. | 455/249 |
| 6,072,778 A | * | 6/2000 | Labedz et al. | 370/252 |
| 6,111,857 A | * | 8/2000 | Soliman et al. | 370/254 |
| 6,125,279 A | * | 9/2000 | Hyziak et al. | 455/445 |
| 6,128,500 A | * | 10/2000 | Raghavan et al. | 455/453 |
| 6,208,871 B1 | * | 3/2001 | Hall et al. | 455/517 |
| 6,347,217 B1 | * | 2/2002 | Bengtsson et al. | 455/67.7 |

* cited by examiner

Primary Examiner—Huy D. Vu
Assistant Examiner—M. Phan
(74) Attorney, Agent, or Firm—Dilworth & Barrese LLP

(57) ABSTRACT

A method for optimizing the performance of the code division multiple access system and the air field environments is disclosed. The invention includes the step of connecting a CDMA mobile station to a PC (Personal Computer), the step of connecting a GPS (Global Positioning System) to the PC, the step of operating a DM (Diagnostic Monitor) under a windows OS (Operating System), the step of requesting desired data to be transmitted to the mobile station by the DM, the step of measuring corresponding items and the present state [OF WHAT?] and transmitting the measured data to the DM, the step of requesting the data of the present position to the GPS by the DM, the step of transmitting the data of the present position to the DM by the GPS, the step of analyzing the data received from the mobile station and the GPS by the DM, and the step of displaying the analyzed results.

18 Claims, 3 Drawing Sheets

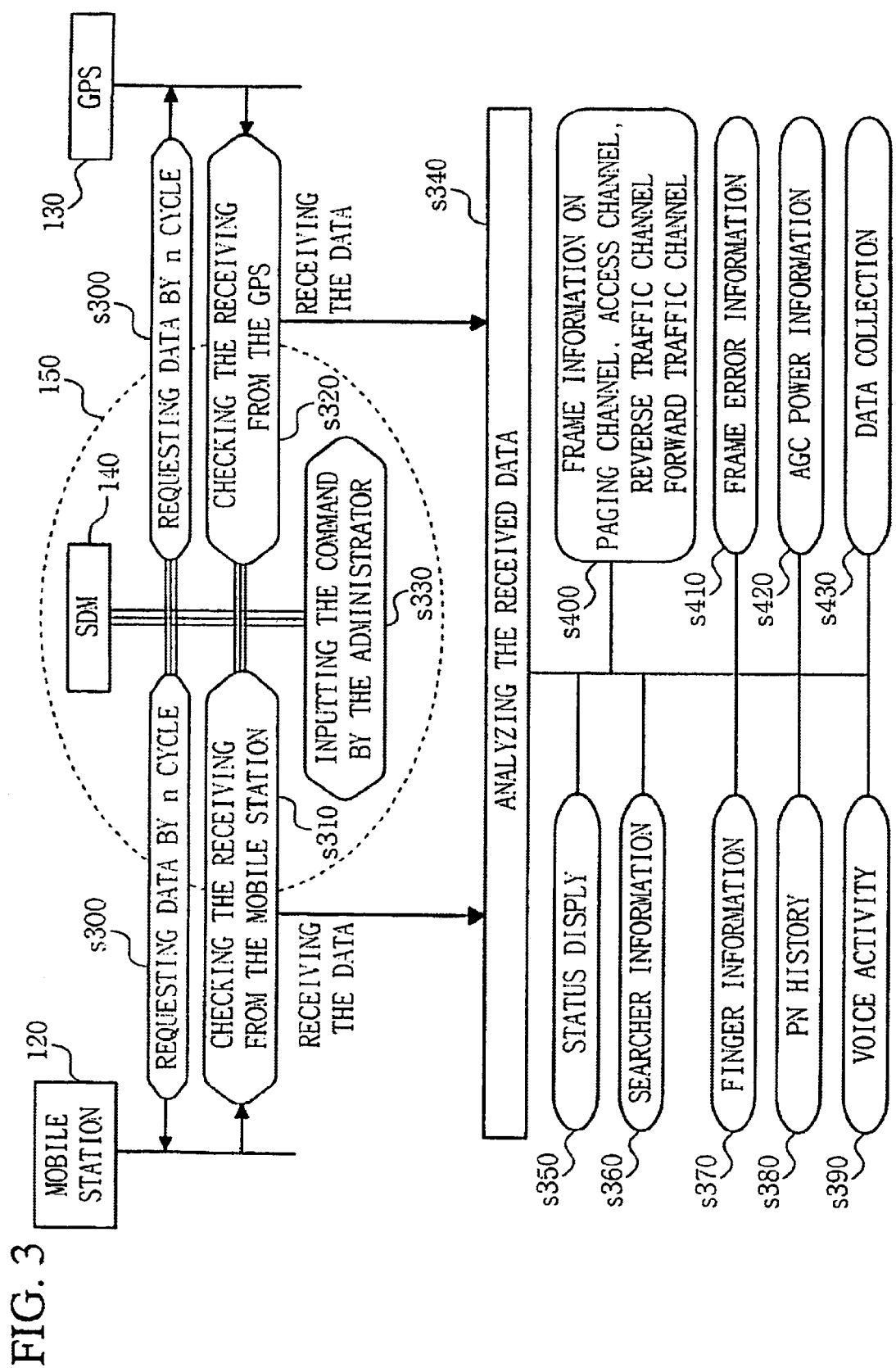

METHOD FOR OPTIMIZING THE PERFORMANCE OF THE CODE DIVISION MULTIPLE ACCESS SYSTEM AND THE AIR FIELD ENVIRONMENTS

BACKGROUND OF THE INVENTION

1. Field of the Invention

The present invention relates generally to cellular communication systems, and more particularly to a method for optimizing the performance of a mobile communication system and the air field environments.

2. Description of the Related Art

FIG. 1 shows a prior art schematic diagram for optimizing the mobile communication system and the air field environments through the use of a DM (Diagnostic Monitor) 30. The mobile station 10 is connected to communication port Com2 of a PC (Personal Computer), and the GPS (Global Positioning System) 20 is connected to Com1 port. The DM 30 is executed on a PC running under an MS DOS operating system 40.

The DM 30 periodically requests predefined data from the mobile station 10 through the Com2 port at step s10, and the mobile station 10 reports the measured data to the DM 30 at step s20. At the same time (step s10), the DM 30 periodically requests GPS information from the GPS 20 through the Com1 port, and receives corresponding information from the GPS at step s30.

The administrator can adjust the scan size of the searcher window by using the direction keys of the PC (right key, left key, etc.) at step s40, and transmit the desired information to the mobile station 10. When log masking is started, the log masked (i.e., necessary) items among the items transmitted from the mobile station 10 and the GPS 20 are collected at step 50. Because the DM 30 operates under MS DOS 40, a maximum of 16 Mbytes can be collected at once. The administrator can modify the screen by selecting the function keys of the PC (F1~F9) and analyze the received data at step 60.

The call status, the channel, and basic information of the mobile station 10 are displayed on the status display at step 70. The scanned Ec/Io, as large as the size of the search window defined for each PN (Pseudo random Noise) offset received from the mobile station 10, is displayed on the screen of the PC as part of the search information provided by the searcher module of the mobile station at step 80. The searcher module's function in the mobile station is to store the pilot signals collected from the neighboring BTSs and search the stored signals during a time defined by the search window interval. Here, the search window interval is a constant time interval. The search window interval is resolved in units of searcher position. For example, if a search window size is specified as 100 ms, then the unit of searcher position (i.e., resolution) might be 1 ms, and the mobile station would read and search the stored pilot signals every 1 ms in order to seek a temporal position having the strongest pilot signal. The size of the search window and resolution of the searcher position are searcher information.

Also, the finger information of the mobile station 10 is received and the Ec/Io information for each finger is displayed at step 90. From the AGC (Automatic Gain Control) power information and the frame error information, the transmitting and receiving voice rate, receiving FER (Frame Error Rate), the transmitting and receiving power, and gain adjustment are displayed at steps 120 and 110. From the frame information, the frame information of the paging channel, access channel, reverse traffic channel, forward traffic channel are displayed at step 100.

The prior art is subject to the following problems and disadvantages. First, because the current general OS (Operating System) platforms run under the windows environments, when a user utilizing a windows based PC wants to use the existing MDM (Mobile Diagnostic Monitor) running on a MS DOS OS platform, he must build an extra OS window for the analytical environments, making it inconvenient for measurement and analysis. Second, because the MDM running under MS DOS OS is limited by the size of the RAM for data collection, the capacity to collect data cannot exceed 16 Mbytes. Third, because the prior art MDM runs under MS DOS and the measurement and analysis tool runs under windows, using the tool is therefore inconvenient. Fourth, the prior art is oftentimes subject to erroneous information when collecting data. Because the reliability of logged data is reduced, a function to detect the erroneous information in the data analysis tool is needed. Fifth, the Ec/Io output signals of the various PN offsets are difficult to monitor in environments having multiple signals. Sixth, though the finger information function transmits the Ec/Io of the fingers, the PN offset information of the fingers is difficult to determine. Seventh, the GPS receiving position information is limited to the trimble GPS. Eighth, in the case of checking field environments using the MDM described above, in an area of rapidly changing PN offsets, the data samples are few, and therefore analysis of the sample data is restrictive. Ninth, because the Ec/Io data update rate of the pilot channel is fast, the transition of the pilot strength cannot be instantaneously known using the diagnostic monitor 30. And tenth, because a specific GPS receiver is used, the user also needs the trimble GPS receiver, and this increases overhead cost.

SUMMARY OF THE INVENTION

One object of the present invention is to provide a method for optimizing the performance of a code division multiple access system and the air field environments. Optimization of the air field environment may be generally defined as optimizing system variables including finger information, frame error, and AGC power.

Another object of the present invention is to provide a method for limiting the capacity of collection data only by the size of the hard disk drive and not by the size of the RAM.

In one aspect of the invention, a method for optimizing the performance of the CDMA system and the air field environments comprises: connecting the CDMA mobile station to a PC; connecting the GPS to the PC; operating the DM (Diagnostic Monitor) under a windows OS environment in said PC; requesting data from the mobile station; the mobile station measuring the requested data items and the present system state, and transmitting the measured data to the DM; requesting the data of the present position from the GPS by the DM; transmitting the data of the mobile station's present position to the DM via the GPS; analyzing the data received from the mobile station via the GPS, by the DM; and displaying the analyzed results.

The operating environment of the test method of the present invention includes the following preferences and assumptions:

1. The DM is preferably an SDM (Samsung Diagnostic Monitor) monitor.

2. The mobile station and the GPS are connected to the PC through respective communication ports of the PC.

3. The DM makes periodic requests for data from the mobile station and the GPS.

4. A manager who manages the DM can adjust the scan size of the searcher window and the output range of the Ec/Io using the direction key of the window.

5. The manager defines the information which he wants to collect, and transmits the defined information as a data request to the mobile station.

6. When the log is started, the log masked items among the items transmitted from the mobile station and the GPS are collected.

7. The display screen to display the analyzed results can be modified by the manager by selecting the corresponding tool bar through the function key or the mouse of the PC.

8. The analyzed results are displayed on the screen through a PN histogram and in accordance with voice activity. The PN histogram can display the Ec/Io histogram for each PN offset per specific time. The voice activity performs its function according to the voice rate.

9. The communication method between the mobile station and the GPS and the DM is asynchronous HDLC (High level Data Link Control) RS-232C.

10. The DM arranges and unifies the checking items when optimizing the field.

11. When the DM is in use, other tools can be concurrently used.

12. The capacity of the DM to collect data is limited only by the capacity of the hard disk drive and not by the size of the RAM.

The information collected and/or displayed as a result of performing the test method of the present invention includes: status display (comprising the basic information of the mobile station, the call status, and the channel); searcher information (Ec/Io information received from the mobile station, the Ec/Io information being scanned in accordance with the size of the windows defined for each PN offset); finger information (displaying the Ec/Io information for each finger when receiving the finger information of the mobile station); AGC (Automatic Gain Control) display information (displaying the transmitting and receiving power and the value of the gain adjustment); frame information (displaying the frame information of the paging channel, the access channel, the reverse traffic channel, and the forward traffic channel); and voice activity information according to the voice rate.

BRIEF DESCRIPTION OF THE DRAWING

FIG. 3 illustrates a further schematic diagram of the method of the present invention in accordance with FIG. 2.

DETAILED DESCRIPTION OF THE PREFERRED EMBODIMENTS

Figure 1:
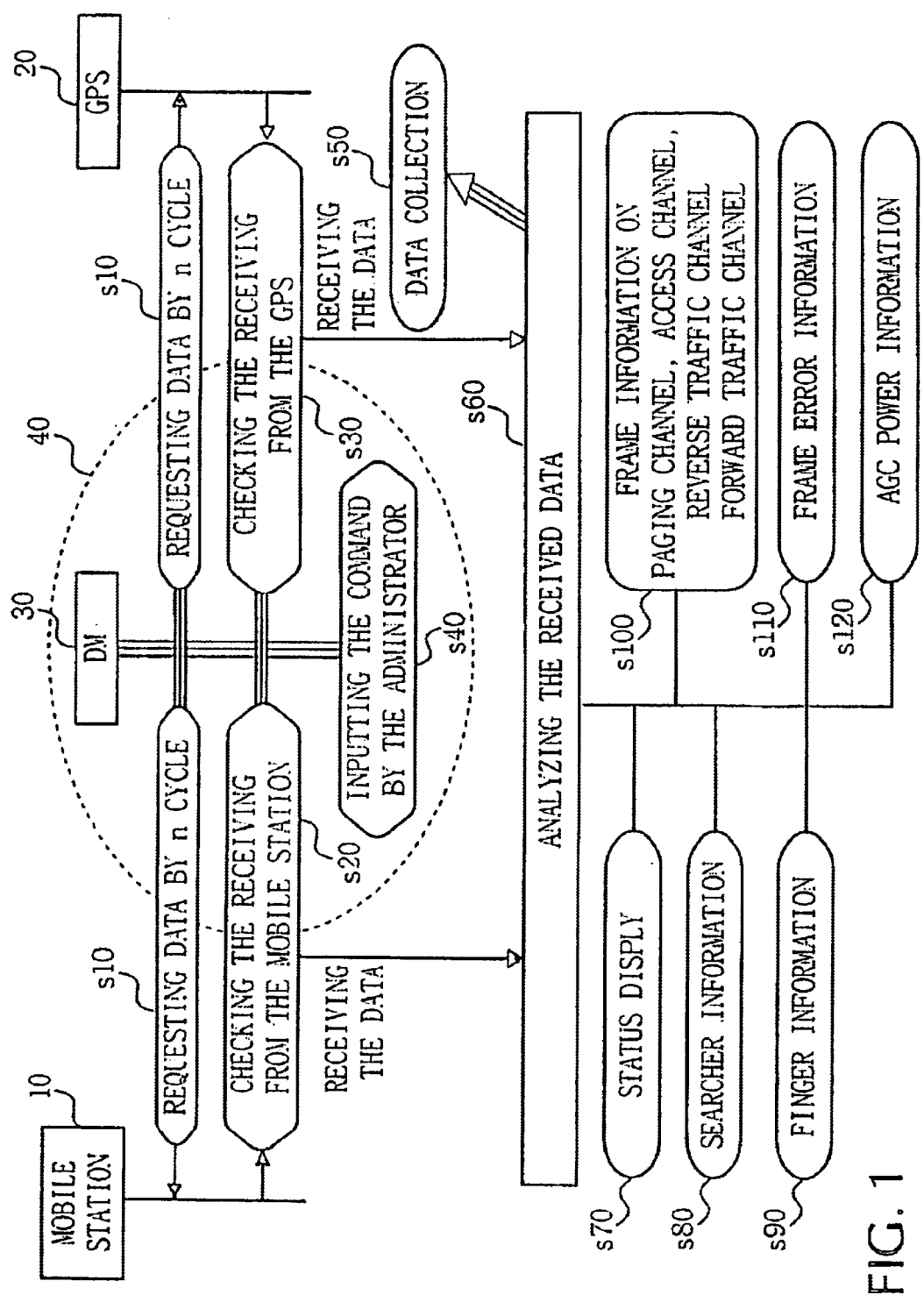
FIG. 1 illustrates a prior art schematic diagram for optimizing the mobile communication system and the air field environments with a diagnostic monitor.
Figure 2:
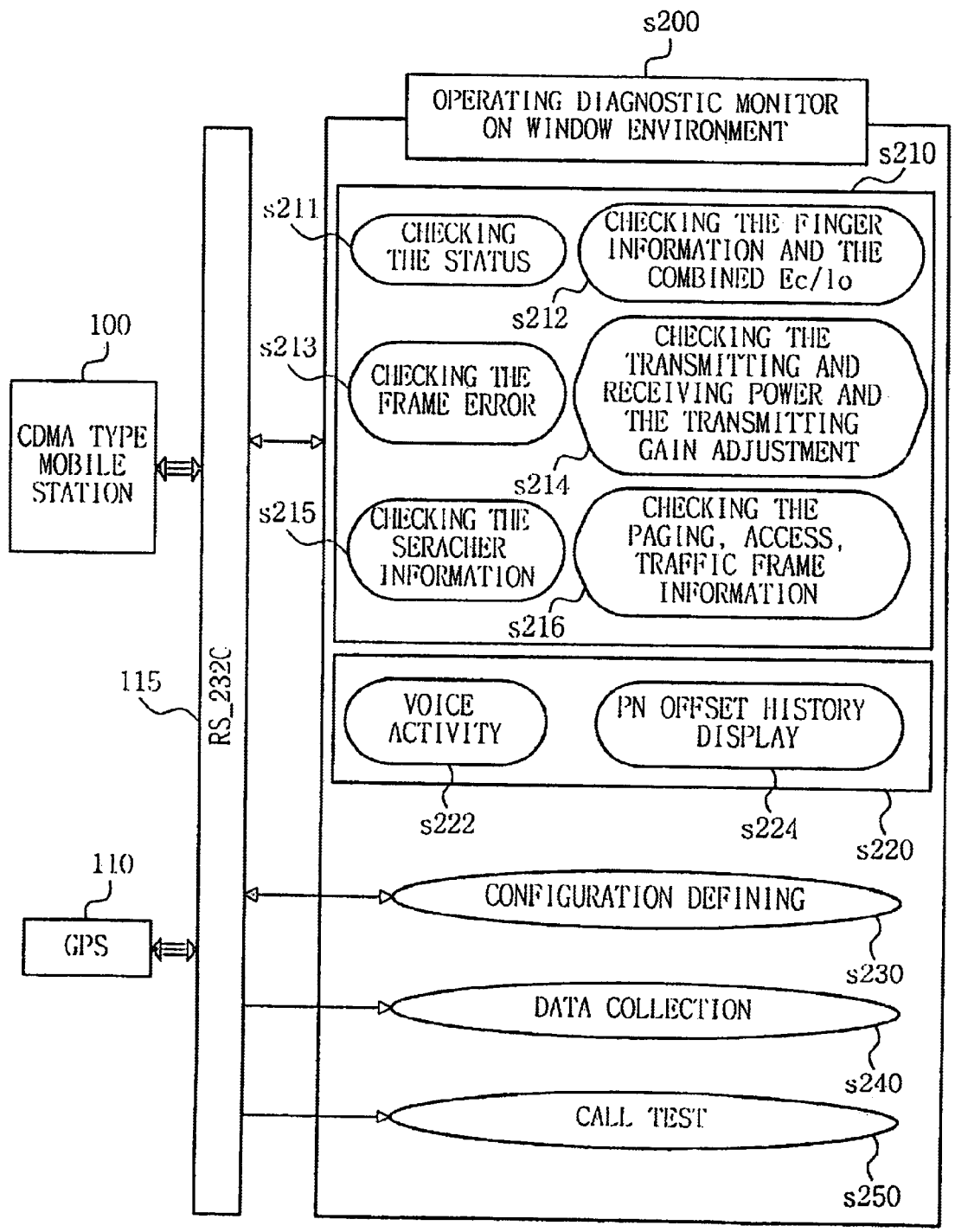
FIG. 2 illustrates a schematic diagram of the diagnostic monitor according to an embodiment of the present invention.

Referring now to FIG. 2, there is illustrated a schematic diagram of an embodiment of the present invention including a mobile station 100 and GPS 110 connected to a diagnostic monitor (DM) (not shown) contained within an asynchronous HDLC RS-232C 115. The DM operates under a windows 32 bit environment, shown at step 200. The DM arranges and unifies the collected test data for optimizing the performance of the CDMA system. The DM's data capacity is limited only by the size of the hard disk drive. Further, when the DM is in use, other tools can be concurrently utilized.

The functions of the DM include: general functions, shown as step 210, and special functions, shown at step 220. The general functions include status checking at step 211, checking the finger information and the combined Ec/Io at step 212, checking the frame error at step 213, checking the transmitting and receiving power and the transmitting gain adjustment at step 214, checking the searcher information at step 215, and checking the paging information, the access information, the traffic frame information at step 216. The special function includes the PN offset history display function at step 224 and the voice activity function at step 222. Other functions performed by the DM include a configuration defining function at step 230, which defines the various types of required testing, and their associated parameter values; a data collection function at step 240 which collects the data required for the analysis; and the call test function at step 250 which contains the MIN (Mobile Identification Number), the Send function, and the End function.

FIG. 3 shows a schematic diagram for optimizing the performance of the mobile communication system and the air field environments by the DM according to the present invention and as set forth in FIG. 2. The mobile station 120 is connected to the Com1 port of the PC, and the GPS 130 is connected to the Com2 port of the PC. In the present embodiment, a library is built which can be used by another GPS. When both connections are complete, the DM is initialized to operate in the windows OS environment 150. With the DM initialized, the DM periodically makes data requests to the mobile station 120 through the Com1 port at step s300, and the mobile station 120 responds to the DM data requests by reporting the data to the DM at step 310.

In the same manner as above, and at the same time, the DM requests the GPS 130 to transmit the GPS information through the Com2 port at step 300. The requested GPS 130 transmits the requested data to the DM at step 320. When the DM receives the data from the mobile station 120 and the GPS 130, the DM analyzes and displays the received data at step 340. In the present invention, a Samsung diagnostic monitor (SDM) 140 is preferably used as the DM. In the SDM, commands are input by a test administrator or manager at step 330.

The manager can modify the display screen by selecting the tool bar through the function keys of the PC or the mouse attached to the PC. In addition, the scan size of the searcher window and the output range of the Ec/Io can be adjusted by the manager by using the direction keys of the searcher window to transmit the desired information to be collected and the definition of the desired information to the mobile station 120.

When log masking is started, the log masked items among the items received from the mobile station 120 and the GPS 130 are the only collected items.

The display screen of the PC may include screens to display the following information as requested by the operator or manager: a status display at step 350 which includes basic information about the mobile station 120, the call status, and the channel; the searcher information at step 360 which displays the Ec/Io information received from the mobile station 120 to the screen, and in this case the Ec/Io information is scanned as large as the size of the windows defined for each PN offset as maintained in the PN history, which may be displayed at step 380; finger information at step 370 which displays Ec/Io information for each finger when receiving finger information from the mobile station 120; AGC (Automatic Gain Control) display information at step 420 which displays the transmitting and receiving power and the value of the gain adjustment; the frame information at step 400 which includes frame information of the paging channel, the access channel, the reverse traffic channel, and the forward traffic channel; and the voice activity information according to the voice rate at step 390; frame error information at step 410; and data collection at step 430.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for optimizing the performance of the CDMA (Code Division Multiple Access) system and air field environments, comprising the steps of:
    (i) connecting a CDMA mobile station to a Personal Computer (PC) having a hard disk drive for collecting data;
    (ii) connecting a Global Positioning System (GPS) to the PC;
    (iii) operating a DM (Diagnostic Monitor) under a windows Operating System (OS) in said PC;
    (iv) making a data request to the CDMA mobile station by the DM; and
    (v) measuring said requested data and the state of said mobile station, and transmitting said measured data to the DM;
    (vi) making a request for present position data to the GPS by the DM; transmitting the present position data to the DM by the GPS;
    (vii) analyzing the transmitted data received from the mobile station and the GPS by the DM; and
    (viii) displaying said analyzed results,
    wherein said analyzed results are displayed on the screen through a PN (Pseudo random Noise) histogram and a voice activity function.

2. The method as set forth in the claim 1, wherein the DM is a Samsung Diagnostic Monitor (SDM).

3. The method as set forth in the claim 1, wherein the mobile station and the GPS are connected to the PC through respective communication ports of the PC.

4. The method as set forth in the claim 1, wherein the DM periodically requests data from the mobile station and the GPS.

5. The method as set forth in the claim 1, wherein a scan size of the searcher window and the output range of the Ec/Io may be adjusted.

6. The method as set forth in the claim 5, wherein said adjustment of the scan size and the output range of the Ec/Io is performed by direction keys of the PC searcher window.

7. The method as set forth in the claim 6, wherein the received data to be analyzed is transmitted to the mobile station.

8. The method as set forth in the claim 7, wherein the received data includes:

status display information, comprising mobile station information, the call status information, and channel information;

searcher information, for displaying the Ec/Io information received from the mobile station to the screen, the Ec/Io information being scanned as large as the size of the windows defined for each PN offset;

finger information, for displaying the Ec/Io information for each finger when receiving the finger information of the mobile station;

AGC (Automatic Gain Control) display information, for displaying the transmitting and receiving power and the value of the gain adjustment;

frame information for displaying the frame information of the paging channel, the access channel, the reverse traffic channel, and the forward traffic channel; and voice activity information according to a voice rate.

9. The method as set forth in the claim 1, wherein when a log is started, the log masked items transmitted from the mobile station and the GPS are collected.

10. The method as set forth in the claim 1, wherein the display screen to display the analyzed results can be aligned to allow an operator to view the results.

11. The method as set forth in the claim 10, wherein said alignment of the display screen is performed by selection of the corresponding tool bar through a function key or the mouse of a PC.

12. The method as set forth in the claim 1, wherein the PN histogram can display the Ec/Io histogram for each PN offset in periodic time intervals.

13. The method as set forth in the claim 1, wherein the voice activity function is performed the fixation according to a voice rate.

14. The method as set forth in the claim 1, wherein communication between the mobile station and the GPS and the DM is asynchronous HDLC (High level Data Link Control) RS-232C.

15. The method as set forth in the claim 1, wherein said DM arranges and unifies the collected data when optimizing a field.

16. The method as set forth in the claim 1, wherein when the DM is in use, other tools of the PC can be concurrently utilized.

17. The method as set forth in the claim 1, wherein the capacity of the DM to collect the data is limited only by the capacity of the hard disk drive.

18. A method for optimizing the performance of a CDMA (Code Division Multiple Access) system and air field environments, comprising the steps of:
    (i) connecting a CDMA mobile station to a Personal Computer (PC) having a hard disk drive for collecting data;
    (ii) connecting a Global Positioning System (GPS) to the PC;
    (iii) operating a DM (Diagnostic Monitor) under a windows Operating System (OS) in said PC;
    (iv) making a data request to the CDMA mobile station by the DM;
    (v) measuring said requested data and the state of said mobile station, and transmitting said measured data to the DM;
    (vi) making a request for present position data to the GPS by the DM;
    (vii) transmitting the present position data to the DM by the GPS;

(viii) analyzing the transmitted data received from the mobile station and the GPS by the DM; and (ix) displaying said analyzed results, wherein a scan size of the searcher window and the output range of the Ec/Io may be adjusted, said adjustment of the scan size and the output range of the Ec/Io is performed by direction keys, the data to be calculated is transmitted to the mobile station, and wherein the data includes:

status display information, comprising mobile station information, the call status information, and channel information;

searcher information, for displaying the Ec/Io information received from the mobile station to the screen, the Ec/Io information being scanned as large as the size of the windows defined for each PN offset;

finger information, for displaying the Ec/Io information for each finger when receiving the finger information of the mobile station;

AGC (Automatic Gain Control) display information, for displaying the transmitting and receiving power and the value of the gain adjustment;

frame information for displaying the frame information of the paging channel, the access channel, the reverse traffic channel, and the forward traffic channel; and voice activity information according to a voice rate.

* * * * *